US010936469B2

(12) United States Patent
Kwon et al.

(10) Patent No.: US 10,936,469 B2
(45) Date of Patent: Mar. 2, 2021

(54) SOFTWARE COMPONENT VERIFICATION USING RANDOM SELECTION ON POOLED DEVICES

(71) Applicant: Microsoft Technology Licensing, LLC, Redmond, WA (US)

(72) Inventors: Hyuk Joon Kwon, Redmond, WA (US); Vladimir A. Levin, Redmond, WA (US); Jakob Frederik Lichtenberg, Redmond, WA (US); Andrew M. Kluemke, Seattle, WA (US); Vikas Pabreja, Sammamish, WA (US); Sebastian Lerner, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 129 days.

(21) Appl. No.: 16/263,993

(22) Filed: Jan. 31, 2019

(65) Prior Publication Data

US 2020/0250072 A1    Aug. 6, 2020

(51) Int. Cl.
*G06F 11/00* (2006.01)
*G06F 11/36* (2006.01)
*G06F 8/77* (2018.01)

(52) U.S. Cl.
CPC ............ *G06F 11/3616* (2013.01); *G06F 8/77* (2013.01); *G06F 11/008* (2013.01); *G06F 11/3664* (2013.01); *G06F 11/3676* (2013.01); *G06F 11/3688* (2013.01); *G06F 11/3692* (2013.01)

(58) Field of Classification Search
CPC . G06F 11/368; G06F 11/3688; G06F 11/3668
See application file for complete search history.

(56) References Cited

U.S. PATENT DOCUMENTS

| 7,111,307 | B1 * | 9/2006 | Wang ................. G06F 11/3668 711/152 |
| 7,181,382 | B2 | 2/2007 | Shier |
| 7,334,219 | B2 | 2/2008 | Cebula |
| 9,389,990 | B2 | 7/2016 | Sofia |

(Continued)

OTHER PUBLICATIONS

Tsirunyan, et al., "The Spruce System: Quality Verification of Linux File Systems Drivers," In Proceedings of Spring/Summer Young Researchers' Colloquium on Software Engineering, Jan. 1, 2012.

*Primary Examiner* — Charles Ehne
(74) *Attorney, Agent, or Firm* — Holzer Patel Drennan

(57) ABSTRACT

A system for providing ongoing verification of released software components utilizes feedback from a pool of devices that each locally execute a verification component. The verification component randomly selects one or more locally-executing software components, captures information associated with the randomly-selected software components responsive to detection of events satisfying one or more capture conditions, and communicates the captured information to a software component verification and analysis service. The total number of the randomly-selected software components within the verification pool is set to statistically guarantee that each one of the software components available for random selection is randomly selected on at least one of the plurality of processing devices within the verification pool.

20 Claims, 5 Drawing Sheets

(56) References Cited

U.S. PATENT DOCUMENTS

| | | | |
|---|---|---|---|
| 2007/0214391 A1* | 9/2007 | Castro | G06F 11/3688 |
| | | | 714/38.14 |
| 2012/0159448 A1* | 6/2012 | Arcese | G06F 8/70 |
| | | | 717/124 |
| 2013/0091495 A1 | 4/2013 | Garg | |
| 2018/0165145 A1 | 6/2018 | Meilke | |

* cited by examiner

SOFTWARE COMPONENT VERIFICATION USING RANDOM SELECTION ON POOLED DEVICES

BACKGROUND

Computing devices today have an increasing number of attached and installed peripheral devices. In order to interface to such peripherals, the computing device typically runs a device driver to operate or control each type of device. As the variety and number of peripheral devices increase and the number of computing devices grows, verifying the proper operation of the device drivers becomes increasingly difficult prior to production and release.

SUMMARY

Figure 1:
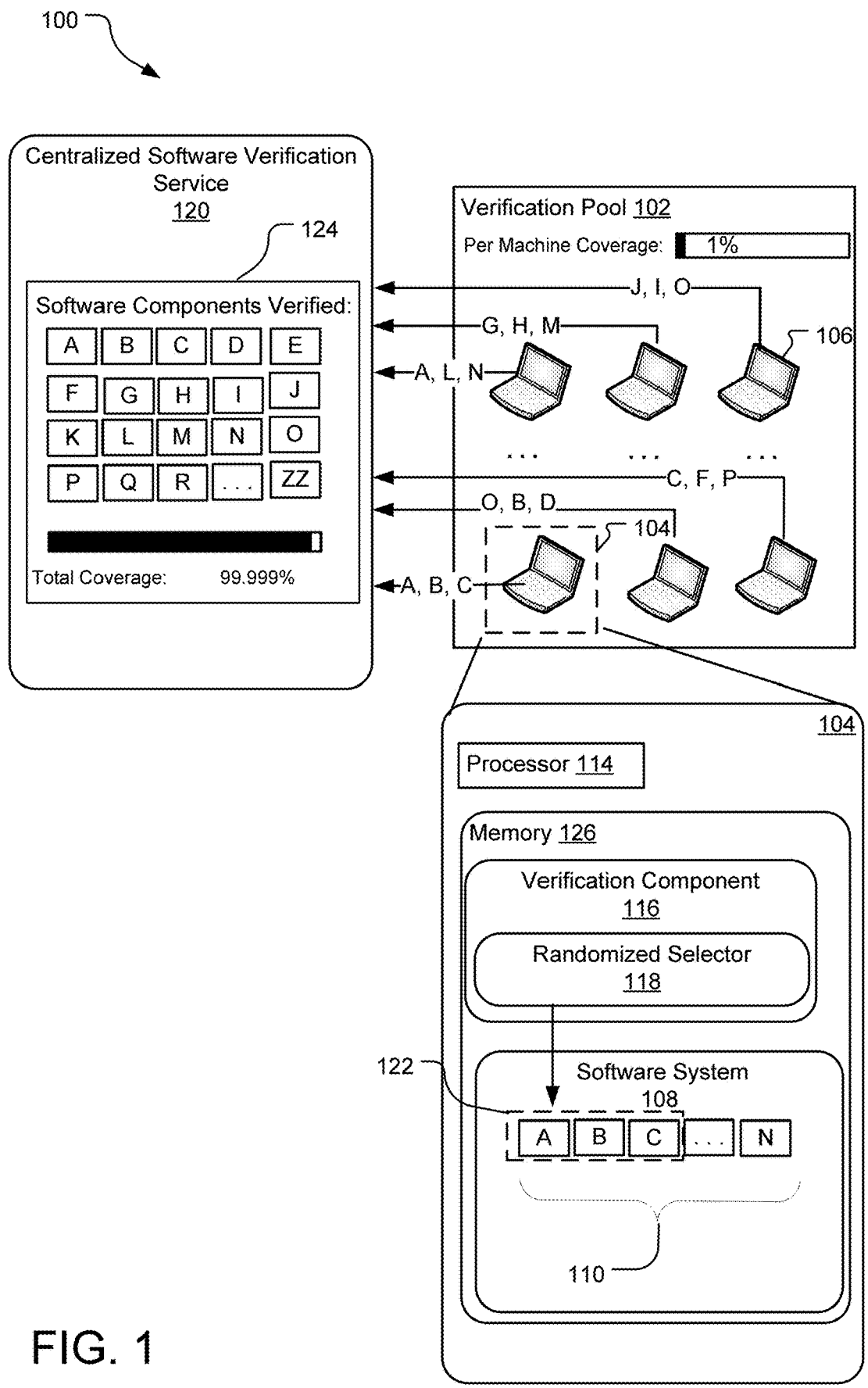
FIG. 1 illustrates an example system that leverages a verification pool to provide ongoing verification of software components that have been released to market.

A method of verifying operations of released software components utilizes feedback from devices participating within a verification pool. The method includes randomly selecting one or more software components executing on each of the processing devices within the verification pool, executing a verification process on each of the plurality of devices to capture information associated with the associated randomly-selected software components responsive to detection of events satisfying one or more capture conditions; and communicating the captured information to a software component verification and analysis service. A total number of the randomly-selected software components in the verification pool is set to statistically guarantee that each one of the software components available for random selection is randomly selected on at least one of the plurality of processing devices within the verification pool.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

A software product, such as an operating system or application, may be installed on thousands of devices including desktop computers, mobile devices, and servers. On these different devices, numerous computing settings may be individually adjusted. Due to the sheer variety and number of possible device configurations, it is onerous and costly to devise tests that encompass all situations that a particular software product may experience. Consequently, certain software products, such as system drivers, may experience problems in the field despite being subjected to rigorous testing and certification processes prior to release. These in-field problems may cause system deadlock and/or memory corruption, leading to system crashes that frustrate and inconvenience the user.

While it is possible to locally-execute programs designed to continually monitor and verify released software components on user devices, most user devices lack the processing capacity to self-verify a significant quantity of locally-executing components. For example, a typical computer may locally execute hundreds of drivers. In these devices, monitoring every single driver would entail a non-trivial and potentially unsupportable allocation of memory and processing resources. Without stringent limits on resource allocation for verification processes, such processes are likely to degrade device performance and frustrate the user experience. At the same time, the breadth of verification that can be achieved through such processes is directly tied to the quantity and use of available processing resources.

The herein disclosed technology provides methods for continued in-field assessment of software components, such as drivers, without noticeable impact on device performance. In the examples described herein, providing driver assessment and support services is one example scenario in which the described embodiments can be implemented. However, the described concepts can generally apply to other software components and services.

According to one implementation, the disclosed methods provide exhaustive coverage in verifying of each of number of software components in a released system by leveraging statistical selection techniques in a pool of user devices each locally-executing a software verification component. As used herein, the term "exhaustive coverage" refers to a statistical guarantee that each of multiple software components in a system has been verified on at least one machine in a verification pool. A "verification pool" refers to a collection of user devices locally executing the verification component and reporting captured data back to a centralized software verification service.

FIG. 1 illustrates one example system 100 that leverages a verification pool 102 to provide ongoing verification of software components that have been released to market. The verification pool 102 includes a number of user computing devices (e.g., user computing devices 104, 106) that are each executing a version of a software system 108 (e.g., an operating system or other application) that comprises a number of software components. The user computing devices in the verification pool 102 may be various types of computing devices with disparate software and/or hardware characteristics. In one implementation, the verification pool 102 consists of a computing devices owned by users that have opted to participate in the verification pool 102, such as by providing explicit consent to provide certain captured device data to a centralized software verification service 120. In some implementations, users with devices of the verification pool 102 may receive access to certain content and/or services in exchange for their participation in the verification pool 102.

As shown in greater detail with respect to the expanded view of the user computing device 104, each device in the verification pool 102 executes a processor 114 and memory 126 storing a software system 108 that consists of a number of software components 110 (e.g., software components A, B, C C . . . N). In one implementation, the software system 108 is an operating system and the various software components 110 are drivers on the operating system that provide control signals to different hardware components, such as drivers for a local audio system, microphone, touchpad, keyboard, network communication, peripheral accessories, etc. Each of the user computing devices in the verification pool 102 executes a same version of the software system 108, such as the same version of an operating system (e.g., Windows 10).

The exact combination of the software components 110 installed within the software system 108 may vary between the various devices in the verification pool 102 depending on factors such as user configurations, attached accessories, and device settings. For example, the user computing device 104 may include a driver (A) for commanding a wireless mouse that is rated as compatible with the software system 108. Although the user computing device 104 is configured to support the wireless mouse, other devices in the verification pool 102 may not be. Likewise, some devices in the verification pool may support different versions of a same software component, such as a network driver. Collectively, the devices in the verification pool 102 may support a diverse collection of software components 110 that are installed on the software system 108 of each device.

Each of the user computing devices in the verification pool 102 includes a verification component 116 that executes locally to monitor and capture certain information associated with a subset 122 of the software components 110 installed on the user computing device 104. The subset 122 of the software components 110 that is monitored by the verification component 116 is selected at random by a randomized selector 118 that is locally installed on each device in the verification pool 102. The verification component 116 monitors the selected subset 122 of components for a period of time during on-going in-field operations of the user computing device 104 and captures certain associated information responsive to satisfaction of predefined capture conditions. This software component monitoring and selective capture of associated information is referred to herein as "verification."

For example, a verification component 116 may capture certain device telemetry when the inputs to, outputs from, or actions of one of the software components 110 of the subset 122 satisfy one or more capture conditions predefined by the centralized software verification service 120. In one implementation, the capture conditions are satisfied when the software system 108 experiences certain anomalous events and/or system errors due to actions of one or more of the randomly-selected software components violate predefined verification rules, such as when one or more of the monitored components performs an action inconsistent with the directives of one or more other system components or an action preidentified as likely to corrupt memory, freeze the system, and/or cause other system error. Violations of one or more such rules triggers a capture of associated telemetry.

The verification component 116 on each device in the verification pool 102 reports the captured information back to a centralized software verification service 120, and the centralized software verification service 120 aggregates the captured information received from the various devices in the verification pool to identify particular software components that are repeatedly experiencing errors and the frequency of those errors. This error tracking information can then be provided to various third-party developers that may utilize such information to update and improve the associated software components. For example, the verification component 116 may observe that a software component 'B' performs several actions that violate rules that have predefined by the centralized software verification service 120. The frequency of these rule violations and other associated information is captured and provided back to the centralized software verification service 120, and the centralized software verification service 120 may then alert the developer of software component 'B' to the nature and extent of such errors experienced on the various devices in the verification pool 102.

Since the verification component 116 randomly selects the software components within the selected subset 122 on each device in the verification pool, there is no need for the centralized software verification service 120 to determine which particular software components are executing on each device in the verification pool 102. Moreover, performing this selection at the device level (rather than by the centralized software verification service 120), eliminates the need to implement centralized logic divvying up the pooled software components among the different devices in the verification pool 102 to ensure each different component in the pool is adequately monitored by one or more devices in the verification pool.

According to one implementation, the centralized software verification service 120 provides the verification component 116 of each of the devices in the verification pool 102 with a capture parameter defining a number of the software components 110 that the verification component 116 is to monitor. This capture parameter is set to ensure that the operations of the verification component 116 do not degrade device performance (e.g., by slowing down system operations) by a degree that is noticeable by an end user. For example, the capture parameter may specify that the verification component 116 is to monitor a small number (e.g., 5) of the locally-installed software components 110 in the software system 108.

In addition to limiting the number of software components monitored by the verification component 116 to mitigate associated observable performance degradation of the device, the capture parameter is also set in relation to the size of the verification pool 102 so as to ensure that the verification performed across the various devices provides exhaustive coverage of all software components that are executing within the software system 108 and available for random selection by the verification component 116 of at least one device in the verification pool 102. As used herein, the term, "exhaustive coverage" is used to refer to a statistical guarantee that each software component available for random selection on at least one device in the verification pool is randomly selected for verification on at least one device in the verification pool 102. "Statistical guarantee" is defined herein to mean a guarantee greater than or equal to a pre-determined high bar value, such as 99.90%, 99.90%, or even higher, depending on product goals. In general, this statistical guarantee is based on the size of the verification pool 102 and the number of software components randomly selected for monitoring on each device in the pool.

In the illustrated example, the verification pool 102 may be understood as including hundreds or thousands of machines. Each machine in the verification pool 102 randomly selects and captures data associated with a subset of its locally-executing software components on the software system 108. According to one implementation, each device in the verification pool 102 actively verifies 1% or fewer of the total number of software components available for random selection and verification within the software system 108 at any given point in time. Due to assumptions that can be made about the average number of numbers of software components that are—in different implementations—made available for random selection on each machine in the verification pool 102, some scenarios may permit for monitoring significantly less than 1% of the pooled software components on each individual machine in the verification pool 102 while still providing exhaustive coverage of all such components. Further statistical scenarios and sample sizes are discussed in greater detail with respect to FIG. 2.

As shown in FIG. 1, each device in the verification pool 102 randomly selects and captures information pertaining to different software components. For example, the user computing device 104 randomly selects and monitors the subset 122 of the software components 110 consisting of drivers A, B, C, while the user computing device 106 randomly selects and monitors a subset of software of the software components 110 consisting of drivers J, I, O. At any given time, two or more devices in the verification pool 102 may actively verify one or more identical software components (e.g., A, B, C. v. A, L, N). This potential for overlap diversifies the collected data (e.g., by monitoring the software component A on two or more differently-configured machines) and provides the centralized software verification service 120 with a diversified dataset reflecting circumstances associated with observed system errors and rule violations in devices with different hardware configurations and configuration settings.

In one implementation, the randomized selector 118 is configured to randomly re-select a new subset of the software components 110 periodically so as to provide monitoring of the various pooled software components on a variety of differently-configured devices within the verification pool. For example, the randomized selector 118 of each device in the verification pool 102 may select a new subset of the software components 110 every two weeks and provide continuous verification of the newly-selected components throughout the following two-week interval. This periodic, random re-selection on each device further diversifies the total number of test scenarios captured by the verification pool 102.

Figure 2:
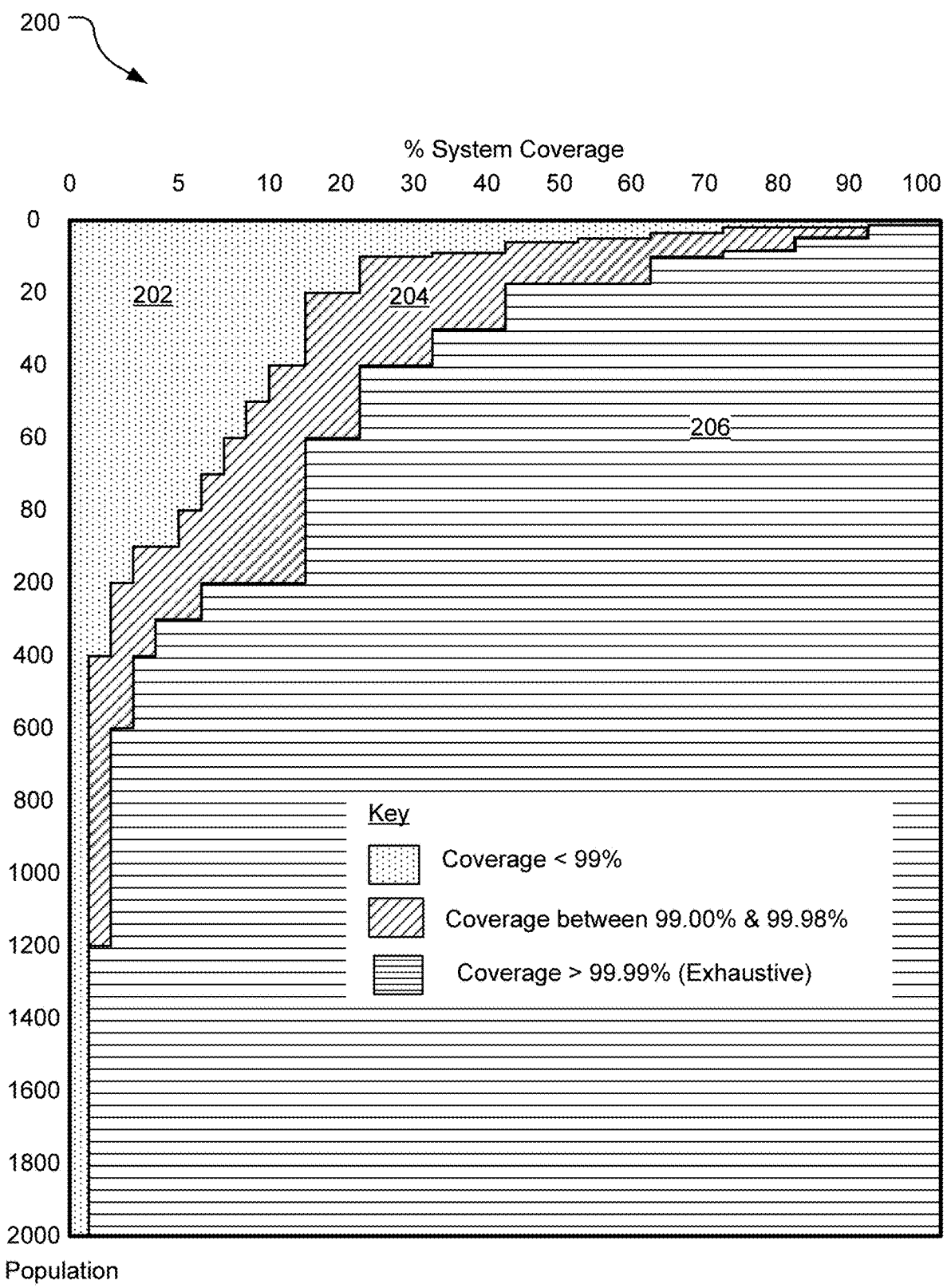
FIG. 2 illustrates an exemplary chart illustrating coverage of system components that may be obtained in a system that randomly selects software components for verification on different machines in a verification pool.

FIG. 2 illustrates an exemplary chart 200 illustrating coverage of system components that may be obtained in a system that randomly selects software components for verification on different machines in a verification pool. By example and without limitation, the randomly-selected software components are—in the following example—discussed as being drivers in an operating system. For example, each of the machines in the population may be understood as executing a same operating system that includes verification component that randomly selects a subset of the locally-executing drivers for an ongoing verification process. It may be appreciated that the same concepts discussed with respect to this example may be extended to implementations that provide verification on software components that are not drivers but are, instead, other executable subcomponents of a system installed on multiple devices.

In FIG. 2, the y-axis indicates "population" or the number of machines participating in a verification pool, while the x-axis represents a "percent of system coverage" that is provided by each individual machine in the verification pool. If, for example, each machine in the population executes an identical operating system with 80 locally-executing drivers while randomly selecting and verifying 4 drivers, each machine can be understood as providing 5% coverage of the entire system. Chart values (represented by shaded areas 202, 204, and 206) within the chart 200 represent a likelihood of exhaustive coverage being provided by the population given the corresponding population size and percentage of coverage that is provided each individual machine in the population.

In FIG. 2, the shaded areas 202, 204, and 206 of the chart 200 represent a likelihood that every driver executing somewhere within the population is selected for verification on at least one machine in the population. The chart 200 illustrates three exemplary tiers of coverage. In a first area 202 corresponding to a first coverage tier, coverage achieved by the population is less than 99% percent. In a second area 204 corresponding to a second coverage tier, the coverage attained by the population is between 99.00% and 99.98% percent. In a third area 206 representing a third tier of coverage, the coverage attained is 99.99 percent or greater. Thus, the third area 206 represents a scenario where the random selection performed by machines within the verification pool provides exhaustive coverage of all system drivers—e.g., a statistical guarantee that every driver in the random selection pool is verified by at least one device of the verification pool. The values represented by the shaded areas 202, 204, and 206 can be arrived at by computing equation (1), below:

$$E = 1 - (1-C)^{-P} \tag{1}$$

where P is the population, C is the percent of system coverage provided by each device in the population (e.g., the percentage of total system drivers that are verified on each individual machine), and E is the likelihood of attaining exhaustive coverage by way of random selection on each device.

Further, the chart 200 is based on the assumption that each machine in the population executes an identical system (e.g., an identical operating system) with an identical collection of drivers (identical driver version number). Additionally, it may be assumed that all drivers can be enabled independently (e.g., without execution of any other driver) and that all drivers have the same impact on performance. If, for example, the verification pool (population) includes 50 machines that each randomly select 10% of the system drivers for verification, there exists a 99.5% chance of exhaustive system coverage. When the verification pool size is expanded to 1200 machines each randomly selecting 1% of the system drivers, there exists a statistical guarantee (99.999%) of exhaustive coverage.

In some systems, the x-axis value (percent coverage by each individual machine in the population), can be determined without knowing the total number of drivers executing in the system due to the fact that these numbers are strongly limited by upper bounds and further due to the fact that distribution of drivers in the population may be accurately estimated. For example, the number of drivers for a given system release being tested by the verification pool may be assumed limited by an upper bound of several thousand (e.g., 5000). This upper bound may define the size of the population that is needed to reach exhaustive coverage (99.999%) with a random selection of 5-10 drivers per machine. Moreover, population statistics can be generated to further approximate the numerical distribution of drivers supported by various machines in the population. For example, datasets may be gathered to determine that in 99% of cases, individual machines in a population do not host more than 500 drivers; in 99.99% of cases, individual machines in the population do not host more than 300 drivers; and that, on average the individual machines in the population do not host more than 200 drivers. Given these available statistics, mathematical simplifications may be further employed to significantly (~10 times) reduce the size of the population that is needed to statistically guarantee exhaustive coverage of all system drivers.

Notably, actual implementations of a system implementing the disclosed technology may be much more complex than the basic, homogeneous probabilistic model of FIG. 2. For example, there may exist scenarios where the machines in the verification pool implement non-identical systems (e.g., by implementing different operating system versions, driver versions, and/or combinations of individual drivers on each machine). Even in these verification pools that implement non-homogenous instances of a system, exhaustive coverage can be statistically guaranteed by adding enough machines to the verification pool to ensure exhaustive coverage of each different version of the system executing within the pool. For example, if the verification pool is designed to ensure that each machine provides 5% coverage of all system drivers and that there exist approximately 200 drivers executing on each individual machine within the pool, exhaustive coverage can be guaranteed provided that the verification pool includes at least 135 machines executing each possible different instance of the system. Statistically, the total size of the verification pool can then be determined to make such guarantee.

Figure 3:
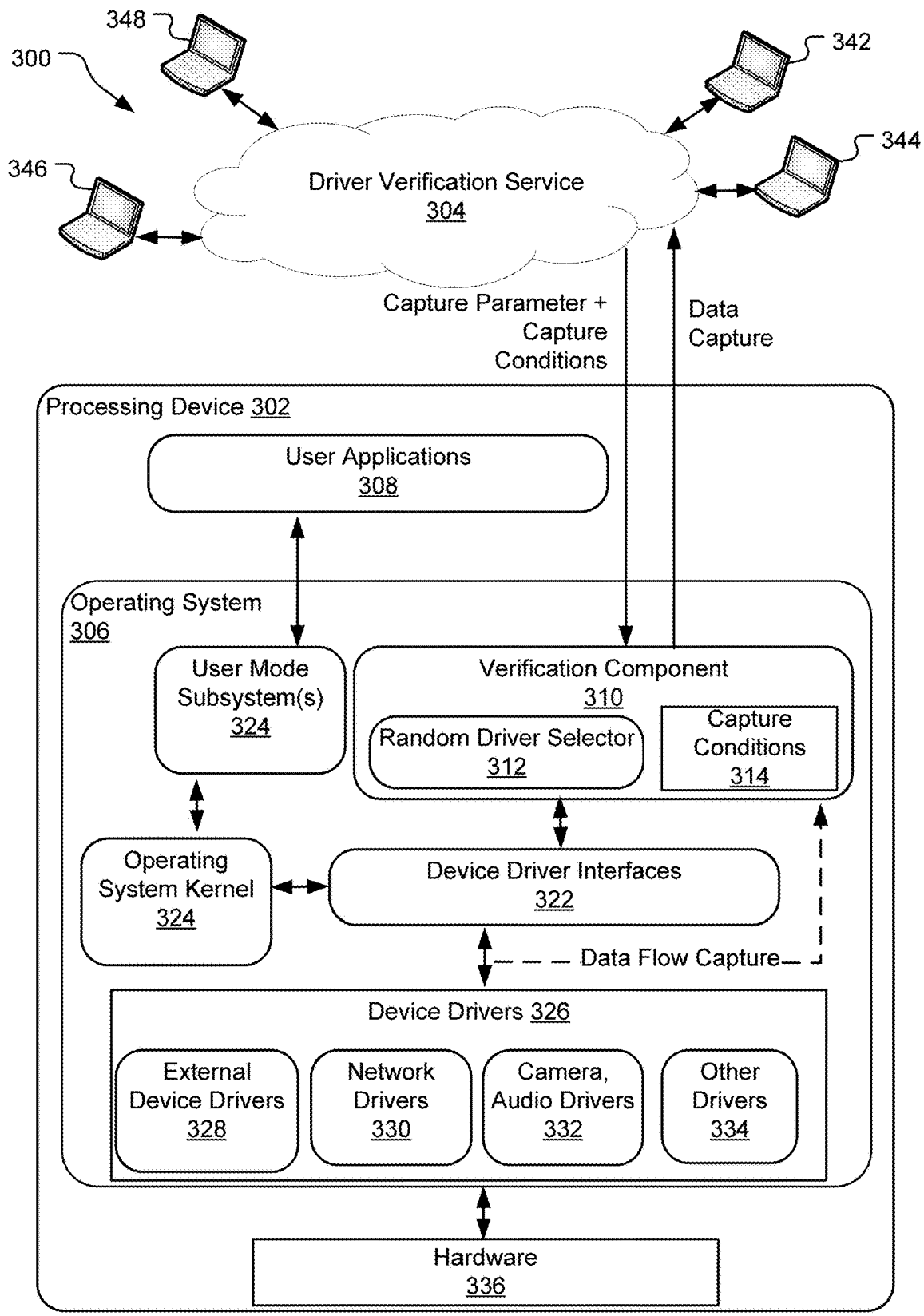
FIG. 3 illustrates an example verification pool that provides ongoing verification of various drivers in an operating system.

FIG. 3 illustrates an example verification pool 300 that provides ongoing verification of various drivers (e.g., device drivers 326) in an operating system 306. For simplicity, the verification pool 300 is shown to include five processing devices (e.g., processing device 302, 340, 342, 344, and 346). In an actual implementation, the verification pool 300 may include hundreds or thousands of devices.

Although the processing devices in the verification pool 300 may be configured differently and/or include different hardware components, each device in the pool is executing a same operating system 306 and includes one or more user applications 308 that places application programming interface (API) function calls to various user mode subsystems 324 of the operating system 306. These API function calls are, in turn, communicated to an operating system kernel 324 that commands device drivers 326 through various device driver interfaces 322. The device drivers 326, in turn, transmit control signals to associated components (e.g., hardware 336) to effect specific control actions such as rendering graphics, playing audio, connecting to a network, etc.

The device drivers of the processing device 302 include drivers such as external device drivers 328 (e.g., wireless mouse, drawing pad, external storage drive), network drivers 320, camera and audio drivers 332, as well as other types of drivers 334. Due to differences in hardware configurations on the different processing devices in the verification pool 300, the specific combination of the device drivers 326 installed on any given one of the processing devices may vary.

The operating system 306 executing on each of the devices in the verification pool 300 includes a verification component 310 that monitors and captures certain information associated with a randomly selected subset of the device drivers 326 installed on the associated device (e.g., the processing device 302). The subset of the device drivers 326 that is monitored by the verification component is selected at random by a random driver selector 312 according to a capture parameter received from a driver verification service 304. In one implementation, the capture parameter specifies a number of drivers that the verification component 310 is to randomly select for verification on the processing device 302. This capture parameter is set to ensure that the operations of the verification component 310 do not degrade device performance (e.g., by slowing down system operations) by a degree that is noticeable to a user of the processing device 302. For example, the capture parameter may specify that the verification component 310 is to verify a small number (e.g., 2-5) of the device drivers 326 on the processing device 302.

In one implementation, the driver verification service 304 provides an identical capture parameter to each of the processing devices within the verification pool 300. For example, the driver verification service 304 may instruct the verification component 310 of each one of the processing devices (e.g., 302, 340, 342, 344, 346) to randomly select three drivers for verification (e.g., monitoring and data capture during ongoing nominal use operations of the associated device).

In addition to mitigating performance degradation on the processing device 302, the capture parameter is also selected so as to guarantee that the random selection of drivers on the various processing devices of the verification pool 300 provides exhaustive coverage of all drivers executing on one or more devices within the verification pool 300. That is, the capture parameter is set to ensure that there exists a 99.99% likelihood that each driver executing on one or more devices in the verification pool 300 is randomly selected for verification by the verification component 310 on at least one device in the verification pool. To ensure exhaustive coverage, the driver verification service 304 may set the capture parameter based on the population of the verification pool 300. When there exist more processing devices in the verification pool 300, exhaustive coverage may be guaranteed while verifying a fewer number of drivers on each individual device. Likewise, the driver verification service 304 may specify a capture parameter that provides for verification of a greater number of drivers on each individual device when the verification pool 300 is smaller.

In addition to specifying the capture parameter (e.g., number of drivers to verify locally), the driver verification service 304 additionally provides the verification component 310 with capture conditions 314 that define trigger conditions (e.g., verification rules) for capturing certain types of data associated with the monitored subset of device drivers 326. In one implementation, the capture conditions 314 define driver verification rules that, if violated by one of the drivers being verified, trigger the logging and/or collection of telemetry flowing between the operating system and the associated one of the device drivers 326. If, for example, the verification component 310 is actively verifying a camera driver and the camera driver takes an action that violates a driver verification rule (e.g., an action preidentified as likely to corrupt memory), the verification component 310 may capture (e.g., intercept and record) some or all telemetry flowing to and from the camera driver within the kernel mode of the operating system 306.

The verification component 310 on each device in the verification pool 300 reports the captured information back to the driver verification service 304 where the captured information is aggregated and analyzed to identify particular device drivers that are repeatedly experiencing errors within the verification pool 300. This error tracking information can then be provided to various third-party developers that may utilize such information to update and improve the associated drivers.

In one implementation, the random driver selector 312 of the verification component 310 is configured to periodically re-perform the random driver selection and select a new subset of the device drivers 326 for verification. In this manner, the specific drivers being verified on the processing device 302 change over time, effectively permitting verification of many different drivers in conjunction with the hardware and configuration settings of the processing device 302. Notably, the above-described driver verification is performed without a centralized determination regarding which drivers are executing on each device in the verification pool 300. This significantly reduces processing overhead while still exhaustive coverage in verifying all system drivers.

Figure 4:
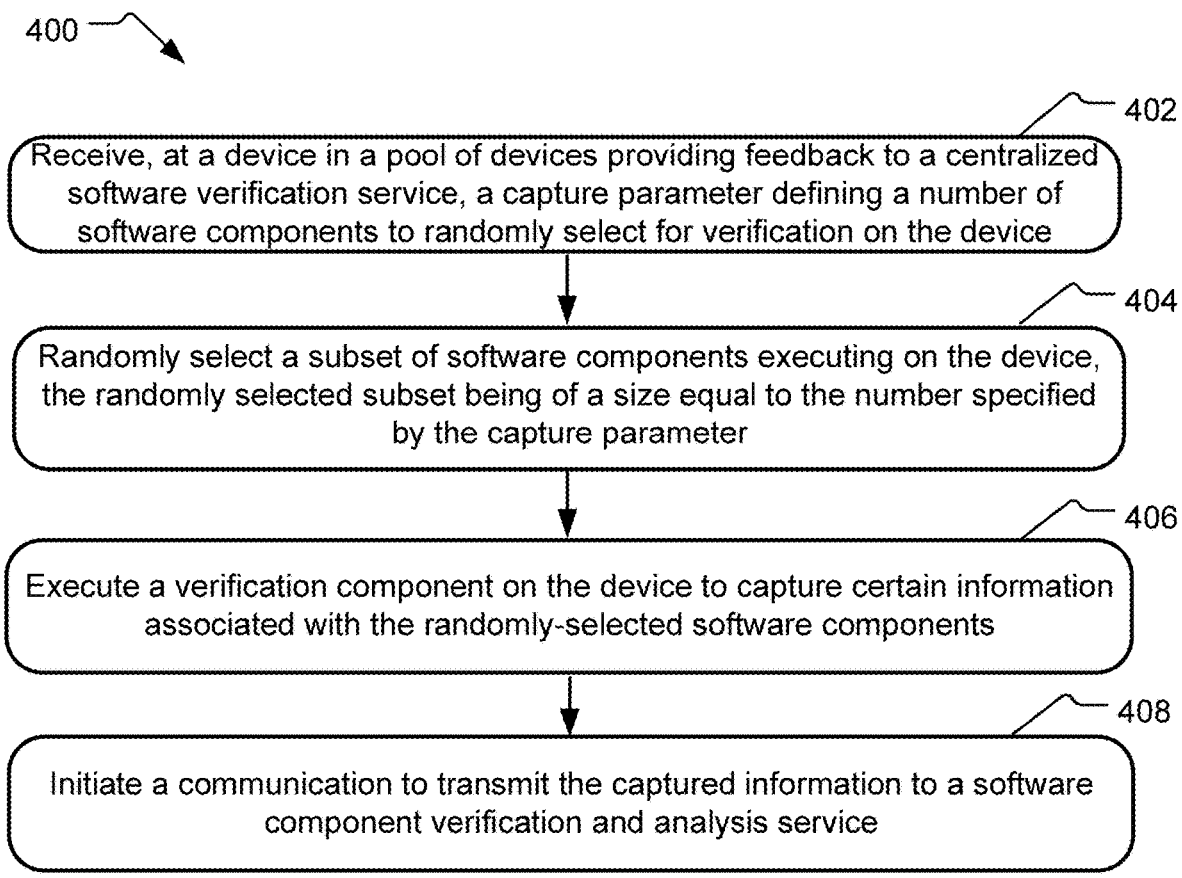
FIG. 4 illustrates example operations for using a pool of devices to verify a collection of software components executing as part of a system installed on each device in the pool.

FIG. 4 illustrates example operations 400 for using a pool of devices to verify a collection of software components executing as part of a system installed on each device in the pool. In one implementation, the operations 400 are performed by the respective individual devices of the pool.

A receiving operation 402 receives a capture parameter defining a set number of software components that are to be verified (e.g., monitored for compliance with various pre-defined verification rules) on a device that is among a pool of devices providing feedback to a centralized software verification service. The specific collection of software components that is available for random selection on each device in the pool may vary from one device to another (e.g., different device may have different drives installed); however, the capture parameter is, in one implementation, set by the centralized data verification service to ensure that each one of the software components available for random selection within the pool of devices is statically guaranteed to be randomly selected for verification on at least one device in the pool. The capture parameter may also be set to mitigate or minimize the number of individual software components verified on each of the devices while still providing the exhaustive coverage of all the software components that are available for random selection and verification.

A random selection operation 404 randomly selects the number of software components defined by the capture parameter from a collection of software components executing on the device, and a verification operation 406 executes a verification component on the device to capture certain information associated with the randomly-selected software components. In one implementation, the verification operation 406 captures telemetry flowing to and from the randomly-selected software component(s) when the actions of such components violate certain predefined rules (e.g., satisfying capture conditions).

A transmission operation 408 transmits the captured telemetry to the software verification service. When the actions 402-408 are performed by each device in the pool, the random selection of software components on each device provides exhaustive coverage of all software components in the system.

Figure 5:
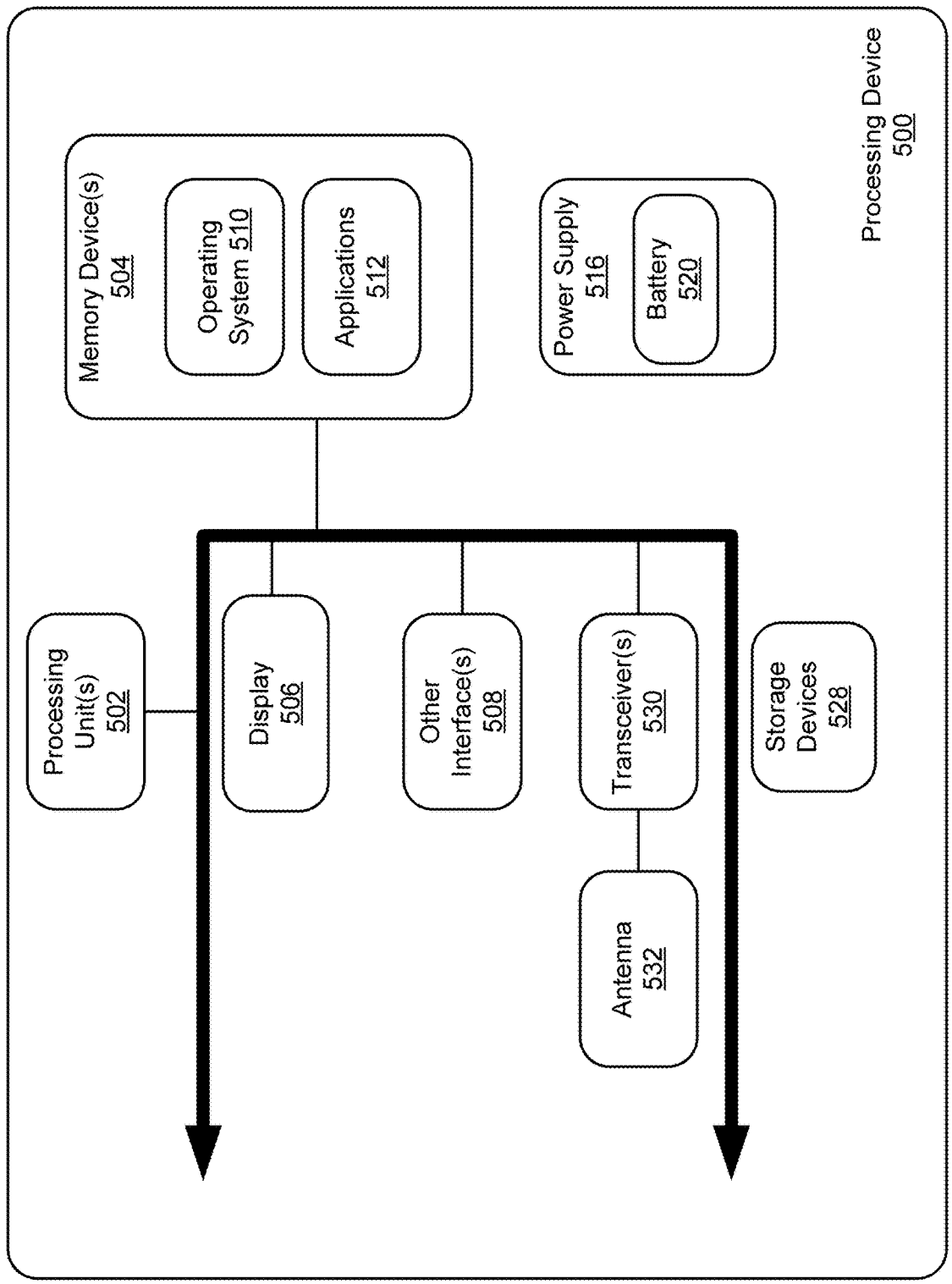
FIG. 5 illustrates an example schematic of a processing device that may be included in a verification pool and suitable for implementing aspects of the disclosed technology.

FIG. 5 illustrates an example schematic of a processing device 500 that may be included in a verification pool and suitable for implementing aspects of the disclosed technology. The processing device 500 includes one or more processor unit(s) 502, memory 504, a display 506, and other interfaces 508 (e.g., buttons). The memory 504 generally includes both volatile memory (e.g., RAM) and non-volatile memory (e.g., flash memory). An operating system 510, such as the Microsoft Windows® operating system, the Microsoft Windows® Phone operating system or a specific operating system designed for a gaming device, resides in the memory 504 and is executed by the processor unit(s) 502, although it should be understood that other operating systems may be employed.

One or more applications 512, are loaded in the memory 504 and executed on the operating system 510 by the processor unit(s) 502. In one implementation, a verification component (e.g., 116 in FIG. 1) is included within the operating system 510. In another implementation, a verification component (e.g., 116 in FIG. 1) is an application that is executed by the operating system 510.

Applications 512 may receive input from various input local devices (not shown) such as a microphone, keypad, mouse, stylus, touchpad, joystick, etc. Additionally, the applications 512 may receive input from one or more remote devices, such as remotely-located smart devices, by communicating with such devices over a wired or wireless network using more communication transceivers 530 and an antenna 532 to provide network connectivity (e.g., a mobile phone network, Wi-Fi®, Bluetooth®).

The processing device 500 further includes storage device 528 and a power supply 516, which is powered by one or more batteries (e.g., a battery 520) and/or other power sources and which provides power to other components of the processing device 500. The power supply 516 may also be connected to an external power source (not shown) that overrides or recharges the built-in batteries or other power sources.

In an example implementation, a verification component includes hardware and/or software embodied by instructions stored in the memory 504 and/or storage devices 528 and processed by the processor unit(s) 502. The memory 504 may be the memory of a host device or of an accessory that couples to the host.

The processing device 500 may include a variety of tangible computer-readable storage media and intangible computer-readable communication signals. Tangible computer-readable storage can be embodied by any available media that can be accessed by the processing device 500 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 500. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some implementations may comprise an article of manufacture. An article of manufacture may comprise a tangible storage medium (a memory device) to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

An example method disclosed herein includes randomly selecting one or more software components executing on each of a plurality of processing devices within a verification pool. A total number of the randomly-selected software components in the verification pool is set to statistically guarantee that each one of the software components available for random selection is randomly selected on at least one of the plurality of processing devices within the verification pool. The method further includes executing a verification process on each one of the plurality of processing devices, and communicating the captured information to a software component verification and analysis service. The verification process of each processing device provides for capture of information associated with the randomly-selected software components on the processing device responsive to detection of events satisfying one or more capture conditions.

In one example method according to any preceding method, the software components are kernel mode drivers of an operating system. In another example method of any preceding method, the one or more capture conditions provide for capture of data when one of the randomly-selected software components performs an action that that violates a verification rule.

In still another example method of any preceding method, a number of software components randomly-selected on each of the processing devices in the verification pool depends upon a total number of processing devices in the verification pool and is set by the software component verification and analysis service.

In yet still another example method of any preceding method, a number of software components randomly-selected on each of the processing devices in the verification pool is capped to a predefined maximum to mitigate performance degradation experienced by each of the processing devices due to execution of the verification process.

In still another example method of any preceding method, the method further includes periodically repeating the random selection of the software components on each of the processing devices in the verification pool, each re-selection providing for a total number of randomly-selected software components selected across the plurality of processing devices that statistically guarantees selection of each one of the software components available for random selection on at least one machine.

In another example method of any preceding method, randomly selecting the software components executing on each of the plurality of processing devices in the verification pool further comprises randomly selecting the software components on each one of the plurality of processing devices without first providing the software component verification and analysis service with information identifying or enumerating a collection of software components available for random selection.

An example system disclosed herein includes a verification component stored in memory and executable on each of a plurality of processing devices in a verification pool. The verification component is configured to: randomly select one or more software components executing on each of a plurality of processing devices within a verification pool; capture information associated with the randomly-selected software components on each of the plurality of processing devices responsive to detection of events satisfying one or more capture conditions; and communicate the captured information to a software component verification and analysis service. A total number of the randomly-selected software components in the verification pool being set to statistically guarantee that each one of the software components available for random selection is randomly selected on at least one of the plurality of processing devices within the verification pool.

In one example system of any preceding system, the software components are kernel mode drivers of an operating system.

In another example system of any preceding system, the one or more capture conditions provide for capture of data when one of the randomly-selected software components performs an action that that violates a verification rule enforced by the verification component.

In yet still another example system of any preceding system, a number of software components randomly-selected on each of the processing devices in the verification pool depends upon a total number of processing devices in the verification pool and is set by the software component verification and analysis service.

In still another system of any preceding system, a number of software components randomly-selected on each of the processing devices in the verification pool is capped to a predefined maximum to mitigate performance degradation experienced by each of the processing devices due to execution of the associated verification component.

In another example system of any preceding system, the verification component is further configured to periodically repeat the random selection of the software components on each of the processing devices in the verification pool, each re-selection providing for a total number of randomly-selected software components selected across the plurality of processing devices that statistically guarantees selection of each one of the software components available for random selection on at least one machine.

In still another example system of any preceding system, the verification component randomly selects the software components on each one of the plurality of processing devices without first providing the software component verification and analysis service with information identifying or enumerating a collection of software components available for random selection.

One or more memory devices storing processor-readable instructions for executing an example computer process comprising: randomly selecting one or more software components executing on each of a plurality of processing devices within a verification pool; executing a verification process on each one of the plurality of processing devices, the verification process of each processing device capturing information associated with the randomly-selected software components on the processing device responsive to detection of events satisfying one or more capture conditions; and communicating the captured information to a software component verification and analysis service. A total number of the randomly-selected software components in the verification pool is set to statistically guarantee that each one of the software components available for random selection is randomly selected on at least one of the plurality of processing devices within the verification pool.

In one example computer process according to any preceding computer process, the software components are kernel mode drivers of an operating system.

In another example computer process of any preceding computer process, the one or more capture conditions provide for capture of data when one of the randomly-selected software components performs an action that that violates a verification rule enforced by the verification process.

In still another example computer process of any preceding computer process, a number of software components randomly-selected on each of the processing devices in the verification pool depends upon a total number of processing devices in the verification pool and is set by the software component verification and analysis service.

In still another example computer process of any preceding computer process, a number of software components randomly-selected on each of the processing devices in the verification pool is capped to a predefined maximum to mitigate performance degradation experienced by each of the processing devices due to execution of the associated verification process.

In yet still another example computer process of any preceding computer process, selecting the software components on each one of the plurality of processing devices further includes randomly selecting the software components on each one of the plurality of processing devices without first providing the software component verification and analysis service with information identifying or enumerating a collection of software components available for random selection.

An example system disclosed herein includes a means for randomly selecting one or more software components executing on each of a plurality of processing devices within a verification pool. A total number of the randomly-selected software components in the verification pool is set to statistically guarantee that each one of the software components available for random selection is randomly selected on at least one of the plurality of processing devices within the verification pool. The system further includes a means for executing a verification process on each one of the plurality of processing devices; and a means for communicating the captured information to a software component verification and analysis service. The verification process of each processing device provides for capture of information associated with the randomly-selected software components on the processing device responsive to detection of events satisfying one or more capture conditions.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. A method comprising:
for each of a plurality of devices within a verification pool, randomly selecting a subset of software components executing on the device for a verification process, a total number of the randomly-selected software components in the verification pool being set to statistically guarantee that each one of the software components available for random selection is randomly selected on at least one of the plurality of processing devices within the verification pool;
executing the verification process on each one of the plurality of processing devices, the verification process of each processing device capturing information associated with the randomly-selected software components on the processing device responsive to detection of events satisfying one or more capture conditions; and
communicating the captured information to a software component verification and analysis service.

2. The method of claim 1, wherein the software components are kernel mode drivers of an operating system.

3. The method of claim 1, wherein the one or more capture conditions provide for capture of data when one of the randomly-selected software components performs an action that that violates a verification rule.

4. The method of claim 1 wherein a number of software components randomly-selected on each of the processing devices in the verification pool depends upon a total number of processing devices in the verification pool and is set by the software component verification and analysis service.

5. The method of claim 1, wherein a number of software components randomly-selected on each of the processing devices in the verification pool is capped to a predefined maximum to mitigate performance degradation experienced by each of the processing devices due to execution of the verification process.

6. The method of claim 1, further comprising:
periodically repeating the random selection of the software components on each of the processing devices in the verification pool, each re-selection providing for a total number of randomly-selected software components selected across the plurality of processing devices that statistically guarantees selection of each one of the software components available for random selection on at least one machine.

7. The method of claim 1, wherein randomly selecting the software components executing on each of the plurality of processing devices in the verification pool further comprises:
   randomly selecting the software components on each one of the plurality of processing devices without first providing the software component verification and analysis service with information identifying or enumerating a collection of software components available for random selection.

8. A system comprising:
   a verification component stored in memory and executable on each of a plurality of processing devices in a verification pool, the verification component configured to:
      for each of the plurality of devices in the verification pool, randomly select a subset of software components executing on the device for a verification process, a total number of the randomly-selected software components in the verification pool being set to statistically guarantee that each one of the software components available for random selection is randomly selected on at least one of the plurality of processing devices within the verification pool;
      capture information associated with the randomly-selected software components on each of the plurality of processing devices responsive to detection of events satisfying one or more capture conditions; and
      communicate the captured information to a software component verification and analysis service.

9. The system of claim 8, wherein the software components are kernel mode drivers of an operating system.

10. The system of claim 8, wherein the one or more capture conditions provide for capture of data when one of the randomly-selected software components performs an action that that violates a verification rule enforced by the verification component.

11. The system of claim 8, wherein a number of software components randomly-selected on each of the processing devices in the verification pool depends upon a total number of processing devices in the verification pool and is set by the software component verification and analysis service.

12. The system of claim 8, wherein a number of software components randomly-selected on each of the processing devices in the verification pool is capped to a predefined maximum to mitigate performance degradation experienced by each of the processing devices due to execution of the associated verification component.

13. The system of claim 8, wherein the verification component is further configured to periodically repeat the random selection of the software components on each of the processing devices in the verification pool, each re-selection providing for a total number of randomly-selected software components selected across the plurality of processing devices that statistically guarantees selection of each one of the software components available for random selection on at least one machine.

14. The system of claim 8, wherein the verification component randomly selects the software components on each one of the plurality of processing devices without first providing the software component verification and analysis service with information identifying or enumerating a collection of software components available for random selection.

15. One or more memory devices storing processor-readable instructions for executing a computer process, the computer process comprising:
   for each of a plurality of devices within a verification pool, randomly selecting a subset of software components executing on the device for a verification process, a total number of the randomly-selected software components in the verification pool being set to statistically guarantee that each one of the software components available for random selection is randomly selected on at least one of the plurality of processing devices within the verification pool;
   executing the verification process on each one of the plurality of processing devices, the verification process of each processing device capturing information associated with the randomly-selected software components on the processing device responsive to detection of events satisfying one or more capture conditions; and
   communicating the captured information to a software component verification and analysis service.

16. The one or more memory devices of claim 15, wherein the software components are kernel mode drivers of an operating system.

17. The one or more memory devices of claim 15, wherein the one or more capture conditions provide for capture of data when one of the randomly-selected software components performs an action that that violates a verification rule enforced by the verification process.

18. The one or more memory devices of claim 15, wherein a number of software components randomly-selected on each of the processing devices in the verification pool depends upon a total number of processing devices in the verification pool and is set by the software component verification and analysis service.

19. The one or more memory devices of claim 15, wherein a number of software components randomly-selected on each of the processing devices in the verification pool is capped to a predefined maximum to mitigate performance degradation experienced by each of the processing devices due to execution of the associated verification process.

20. The one or more memory devices of claim 15, wherein randomly selecting the software components on each one of the plurality of processing devices further comprises:
   randomly selecting the software components on each one of the plurality of processing devices without first providing the software component verification and analysis service with information identifying or enumerating a collection of software components available for random selection.

* * * * *